United States Patent
Henderson et al.

(10) Patent No.: US 8,167,160 B2
(45) Date of Patent: May 1, 2012

(54) DETACHABLY CONNECTED CONTAINER HAVING BARRIER PROPERTIES

(75) Inventors: Eric Thomas Henderson, Dallas, TX (US); John Joseph Michels, Highland Village, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 12/912,899

(22) Filed: Oct. 27, 2010

(65) Prior Publication Data

US 2011/0036834 A1  Feb. 17, 2011

Related U.S. Application Data

(62) Division of application No. 11/358,567, filed on Feb. 20, 2006, now Pat. No. 7,845,147.

(51) Int. Cl.
*A47G 19/00* (2006.01)
*B65D 21/02* (2006.01)

(52) U.S. Cl. .................................................... 220/23.4

(58) Field of Classification Search ............... 220/23.4, 220/23.8; 206/534.1, 558
See application file for complete search history.

(56) References Cited

U.S. PATENT DOCUMENTS

| | | | | |
|---|---|---|---|---|
| 5,409,127 A | * | 4/1995 | Stratford et al. | 220/23.4 |
| 7,104,416 B2 | * | 9/2006 | Gasco et al. | 220/608 |
| 2003/0044552 A1 | * | 3/2003 | Komada | 428/35.7 |
| 2003/0141218 A1 | * | 7/2003 | Stephens et al. | 206/820 |
| 2003/0230582 A1 | * | 12/2003 | Whitmore et al. | 220/507 |

FOREIGN PATENT DOCUMENTS

JP  61-1088  9/1982

* cited by examiner

*Primary Examiner* — Harry Grosso
(74) *Attorney, Agent, or Firm* — Colin P. Cahoon; Cleina M. Orr; Carstens & Cahoon, LLP

(57) ABSTRACT

A method is provided of forming a multi-pack container assembly having at least two containers joined together by a channel. The method includes the steps of providing sheet having a barrier layer thermoforming the sheet into a multi-pack container assembly having a plurality of containers wherein each container comprises a flange and the flanges of adjacent containers are connected by an engineered area of weakness or channel. Resultant containers can be used for low-moisture, shelf-stable, ready-to-eat food products.

18 Claims, 3 Drawing Sheets

DETACHABLY CONNECTED CONTAINER HAVING BARRIER PROPERTIES

This application is a divisional of U.S. application Ser. No. 11/358,567 entitled "Method for Producing a Detachably Connected Container Having Barrier Properties" filed on Feb. 20, 2006.

BACKGROUND OF THE INVENTION

1. Technical Field

The present invention relates to a detachably connected multi-pack container assembly having barrier properties.

2. Description of Related Art

Multi-pack container assemblies for storing several separate items are known. Individual servings of refrigerated food products such as yogurt and pudding, and many other products can be packaged individually in such multi-pack container assemblies. These multi-pack container assemblies typically include several containers that are joined together to form a pack of individually sealed servings. Consumers will know that each container can be separated from the multi-pack so that items in the containers can be used.

Typically, conventional multi-pack container assemblies are made by thermoforming polystyrene. Thermoforming is a widely known process for making containers well known to those skilled in the art. In thermoforming, a sheet of thermoplastic resin having a thickness can be clamped into a clamp frame and heated. An oven or heat station heats the edges as well as the center of the thermoplastic sheet so that when the sheet is subsequently delivered to a forming station, an overall temperature balance has been attained. On being heated, the sheet is conveyed to the forming station where by one of several methods it is forced over a mold. The thermoforming of the polyolefin sheet can be performed by means of different, conventional techniques, for instance, a vacuum can be applied in the mold and/or a counter mold can be used to help form the sheet into a container. The residual heat of the plastic can be removed after forming. After cooling, the end product is removed from the forming station and sent to a trim press where the end product is trimmed from the web.

One disadvantage of polystyrene is that is has poor moisture barrier properties. Thus, while polystyrene works well for refrigerated food items such as yogurt and pudding, polystyrene containers are undesirable for items such as low moisture snack foods that require a containers having moisture barrier properties. Unlike polystyrene, polyolefins, such as polypropylene, have excellent moisture barrier properties.

One drawback of using polyolefin containers such as polypropylene is that polypropylene has a high tear strength. Tear strength measures the tear resistance of a material. Because of the high tear strength of polypropylene, it is commonly used in "living hinges." A living hinge is a flexible hinge of plastic that is molded as one piece with the rest of the container or package, connecting the sturdy top and bottom sections. The material properties of the polypropylene permit the hinge to be flexed repeatedly over time without cracking or breaking Thus, polypropylene packages are not conducive to detachably connected multi-pack assemblies. Consequently, when it's been desired to provide a polypropylene-based multi-pack container assembly, cardboard is used to bundle several separate containers together. The manufacturing process used to produce cardboard bundled individual polypropylene containers, however, is expensive. Material costs are higher because cardboard must be used in addition to plastics material. Further, assembly costs are higher because separate cardboard handling machinery is needed to bundle the individual containers together. Another disadvantage of cardboard bundled polypropylene containers is that a consumer must tear through the cardboard in order to get a container which separates the containers from one another. Once separated, containers are no longer stored as easily as when bundled.

U.S. Pat. Nos. 5,543,104 and 5,409,127 disclose an injection molded container assembly made of high-density polyethylene ("HDPE"). While HDPE containers do have moisture barrier properties, HDPE lacks oxygen barrier properties.

To enhance the shelf life of a food product contained therein, a plastic food container must have adequate barrier properties to protect the product from the migration of moisture or moisture and oxygen into the container. This is typically accomplished by combining, in a layered arrangement, several polymer sheets, each sheet having distinct barrier properties. The typical goal in constructing such container is to provide in the aggregate a layered sheet container that can be constructed at a minimal cost, and yet provide adequate barrier properties to light, moisture, and oxygen without impacting the taste of the product in the container.

For example, EVOH has been found to be an excellent oxygen barrier that reduces oxygen migration into plastic containers. EVOH has been used successfully in combination with, for example, polyethylene, or polypropylene (PP), where the polypropylene or PP provides the moisture barrier properties for the container. Another benefit of using EVOH in containers for food products is its resistance to the migration of oils and contaminates, either from other sheet layers migrating into the product or from the product leaching into the container walls. For example, when post-consumer reground (PCR) polyolefin resins are used as one of the sheet layers for a container, EVOH has been found to be an effective barrier to prohibit contaminates from the PCR resin from being leached into a food product that is placed in the container. An EVOH layer has also been found to be an effective scalping barrier to prevent the absorption of oil and oil-soluble flavors from packaged food.

It is difficult to foresee how a container having a layered arrangement of polymer sheets can be made by an injection molded process, since such process by its very nature fails to provide a layered arrangement because a liquefied plastic mixture must be injected into a mold, resulting in a mixture with no contiguous oxygen barrier layer. Further, the capital costs associated with injection molded items is relatively expensive. Consequently, a need exists for a method for making a detachably connected multi-pack container wherein such container can provide a manufacturer the option of a container having either moisture barrier properties or moisture and oxygen barrier properties.

SUMMARY OF THE INVENTION

The proposed invention provides a method for making a detachably connected multi-pack container having barrier properties. In one embodiment, the present invention provides a method for making a detachably connected multi-pack container assembly that can store low moisture shelf-stable ready-to-eat food products. In one embodiment, moisture barrier properties are provided by a polyolefin sheet. In one embodiment, oxygen barrier properties are provided by an EVOH film adhered to the polyolefin sheet. A channel disposed between the flanges of adjacent containers is provided to enable detachment of the adjacent containers such that unintended tearing occurring in the flange area is avoided. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
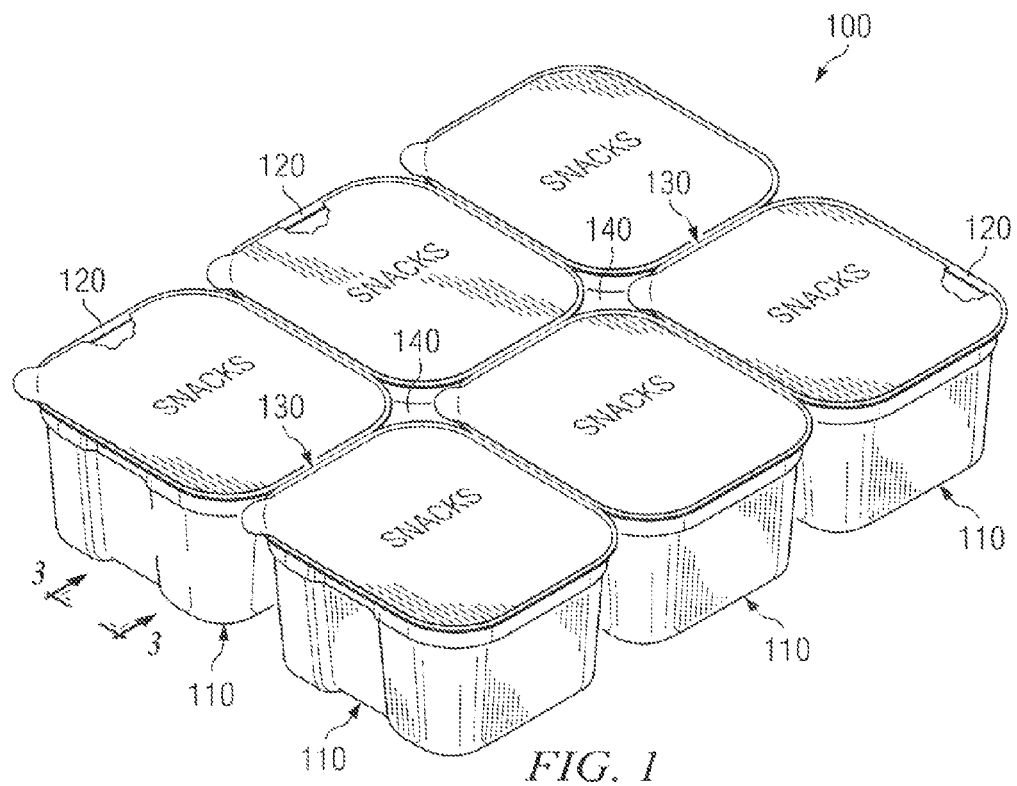
FIG. 1 is a perspective view of a thermoformed multi-pack container assembly showing six containers in accordance with one embodiment of the present invention.

FIG. 1 is a perspective view of a thermoformed multi-pack container assembly 100 showing six containers 110 in accordance with one embodiment of the present invention. Although the thermoforming process is known in the art, as used herein, the thermoforming process should be construed to include other equivalent processes including, but not limited to, pressure forming and vacuum forming processes. The multi-pack container assembly 100 comprises a plurality of individual containers 110 wherein the periphery of the top of each container comprises an outwardly projecting flange 120. Adjacent containers 110 are detachably connected by an engineered area of weakness or channel 130 provided between the adjacent container flanges 120. As used herein a channel 130 corresponds to a thinned area between adjacent container flanges that permits the containers to be separated. As used herein, "thinned area" is not a reference to a reduced area as a result of scoring or perforations, but rather means that the channel thickness 132 (as depicted in FIG. 4, discussed below) is thinned and is less than the flange 120 thickness.

In one embodiment, the channel 130 adjoins only a portion of the container length and/or container width. Consequently, in one embodiment, a portion 140 of the assembly 100 can be cut out or trimmed during or after the thermoforming operation. In one embodiment, the portion 140 is cut out in the trim press after the containers have been formed. Although FIG. 1 depicts the multi-pack container assembly as having six containers 110, the multi-pack container assembly can comprise two or more containers. In one embodiment, the channel 130 can be made in the trim press after the containers have been formed.

Figure 2:
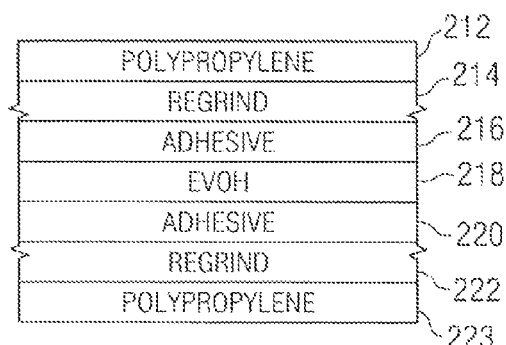
FIG. 2 is a cross-sectional schematic view of a multi-layered sheet incorporating EVOH in accordance with one embodiment of the present invention.

FIG. 2 is a cross-sectional schematic view of a multi-layered sheet incorporating EVOH in accordance with one embodiment of the present invention. In the embodiment shown, the outside polypropylene layer 212 is adjacent to a post-consumer regrind resin 214 which is joined by a first adhesive layer 216, such as a modified polyethylene, to an EVOH layer 218. The EVOH layer 218 is then joined by a second adhesive layer 220 to the interior post consumer regrind resin 222. The outermost product-side polypropylene layer 223 provides a moisture barrier layer.

The regrind 214, 222 can be made from a portion of the multi-layer sheet that is cutout from the area depicted as numeral 140 in FIG. 1 and routed back into an extruder where it can be sheeted and co-extruded or laminated into the multi-layer sheet that can be used in accordance with the present invention.

In one embodiment, the multi-layer sheet comprises a material having moisture barrier properties adhered to a material having oxygen barrier properties adhered to another material having moisture barrier properties.

In one embodiment, the layer having moisture barrier properties comprises a polyolefin. Any polyolefin having a moisture vapor transmission rate of less than about 25 g/day/m$^2$/mil (38° C., 90% relative humidity) and more preferably less than about 4.8 g/day/m$^2$/mil (38° C., 90% relative humidity) has the requisite moisture barrier properties that can be used in accordance with the present invention. In one embodiment, the polyolefin having moisture barrier properties comprises polypropylene, and in an alternative embodiment, such polyolefin comprises high-density polyethylene.

In one embodiment, the layer having oxygen barrier properties comprises EVOH. Any polyolefin having an oxygen transmission rate of less than about 1.92 cc/day/m$^2$/mil (73° F., 0% relative humidity) and more preferably less than about 0.4 cc/day/m$^2$/mil (73° F., 0% relative humidity) has the requisite oxygen barrier properties that can be used in accordance with the present invention.

Figure 3:
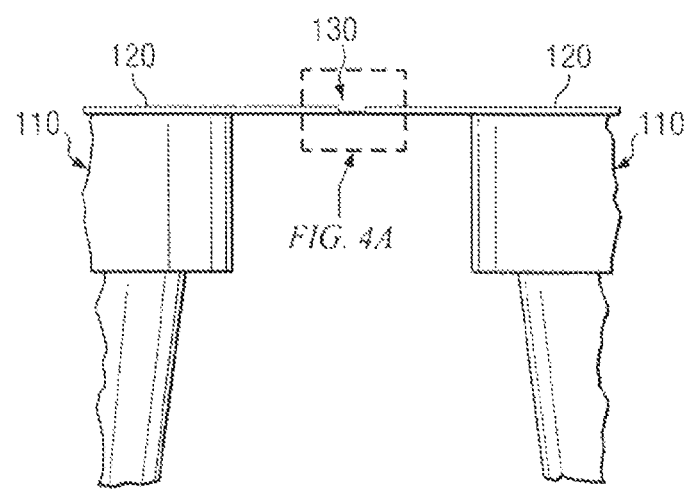
FIG. 3 is an end view of the multi-pack container assembly depicted in FIG. 1 showing an area of weakness between the flanges of the adjacent containers.

FIG. 3 is an end view of the multi-pack container assembly shown in FIG. 1 depicting an area of weakness 130 or channel between the flanges 120 of the adjacent containers 110. FIG. 4 is a blown up end view depicting the channel depicted in FIG. 3. For simplification, the lidstock is not depicted in FIG. 3 or FIG. 4. As shown by FIG. 3 and FIG. 4, the channel 130 detachably connects the flanges 120 of adjacent containers 110. The channel 130 can be created by a flat die plate used in the thermoforming process. The channel 130 can also be created with a knife. The channel 130 comprises a channel thickness 132 and a channel width 134. The channel 130 creates a way to control the tearing of materials such as polypropylene that do not easily tear.

Figure 4A:
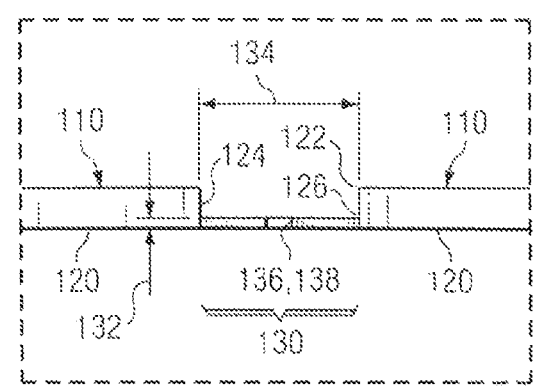
FIG. 4A is a blown up end view depicting the channel depicted in FIG. 3.

Referring to FIG. 4A, in one embodiment, the channel thickness 132 is less than about one-half of the flange 120 thickness. A larger differential between the flange 120 thickness and the channel thickness 132 can help ensure tearing occurs in the channel 130 and does not migrate into the flange 120. In one embodiment, the channel thickness 132 thickness is greater than about 1 mil. In one embodiment, the channel thickness 132 is about 5 mils. In one embodiment, the flange 120 comprises a thickness of more than about 5 mils. In one embodiment, the flange 120 comprises a thickness of between about 10 mils and about 50 mils before clamping in the mold and between about 5 mils and about 45 mils after clamping. In one embodiment, the flange thickness is between about 25 and about 35 mils before clamping and between about 20 and 30 mils after clamping.

Although the illustration depicted in FIG. 4A shows the bottom of the channel 130 as being flush with the bottom flange 120 of the adjacent containers, such configuration is shown for purposes of illustration and not purposes of limitation. For example, the top of the channel can be flush with the top of the flange 120, or the channel can be stepped with the both top and bottom of the flange. Such configurations are intended to be covered by the scope of the present invention.

Figure 5:
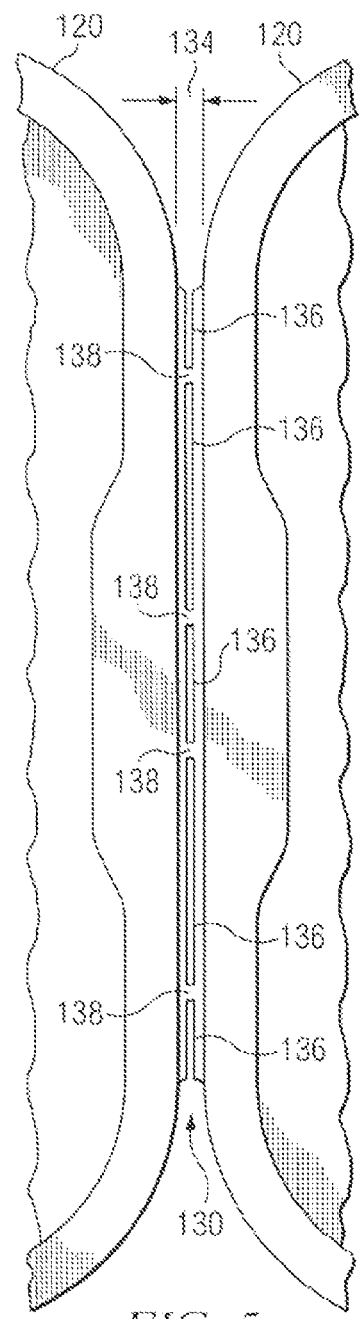
FIG. 5 is a blown up top view depicting the channel depicted in FIG. 3.

FIG. 5 is a blown up top view depicting the engineered area weakness or channel 130 depicted in FIG. 3. Controlled tearing or separation between the two flanges can be facilitated by a perforation. The channel width 134 can be sized and shaped to permit a knife used for perforation to perforate the channel thickness 132. The channel width 134 can thereby be sized in accordance with the accuracy to which the knife or other perforation means can be accurately placed into the channel 130 to perforate the channel 130. In one embodiment, the channel width 134 is greater than about 20 mils. In one embodiment, the channel width 134 is between about 20 mils and about 100 mils. In one embodiment, the channel width 134 is created with the knife and comprises a channel width 134 that is the same width of the knife making the channel 130.

Figure 4B:
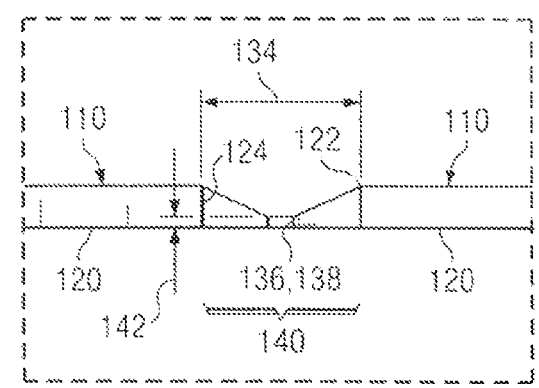
FIG. 4B depicts another embodiment of the channel depicted in FIG. 4A.

The perforation can comprise any combination of cuts 136 and ties 138. A cut 136 penetrates the channel thickness and a tie 138 functions to connect the two flanges 120 together. Such cuts 136 can be made at the trim press after the containers have been formed. Referring to FIGS. 4A, 4B, and 5, the channel thickness 132 can be manipulated as desired depending upon several factors including the rigidity of the material used, the ease of separation of the flanges, and the perforated or cut 136 length, and the tie lengths 138. Similarly, the cut lengths 136 and tie lengths 138 can also be adjusted as desired in order to achieve the desired amount of controlled tearing. The "percent of hold" is the percent of material remaining uncut after a stock is perforated. Determining the optimum percent of hold is a function of the properties of the material and the channel thickness 132. The exact length of the perforations 136 can be obtained through experimentation. Thus, the variables with the channel 130 including the channel thickness 132 should be optimized so that when the containers are detached from one another a controlled tearing is achieved down the line of engineered weakness and not into the flange area 120 of the containers.

Referring back to FIG. 4A, the channel depth can be defined as the difference between the thickness of the flange 120 and the channel thickness 132. In one embodiment, the channel width 134 is substantially the same along the channel depth. Consequently, in one embodiment, the channel 130 is substantially U-shaped. One advantage to such configuration is that the perforation device can fall anywhere within the channel trough 130 and the thickness of the cuts 136 are going to be substantially equal to the channel thickness 132 and are not as variable as would occur in a V-shaped channel.

A V-shaped channel 140 can be undesirable because the trough at the apex of the V 142 comprising the area of minimal channel thickness is a very narrow portion. Further, because the amount of material to be perforated or channel thickness 132 increases as a cutting device moves away from the trough apex or center 142 of the V-shaped channel 140, the ability of a consumer to tear the polypropylene to remove a container from the container assembly becomes more difficult. Further, the severed tie lengths 138 can be sharper with an increased channel thickness which is highly undesirable to consumers handling the detached container. However, a V-shaped channel 142 could be used if the accuracy of the perforating means was very high. Consequently, in one embodiment (shown in FIG. 4B), the channel 140 is substantially V-shaped.

In one embodiment of the present invention, the channel 130 comprises one or more channel walls 124 where the flange terminates 122 at the channel 130. In one embodiment, at least one of the channel walls 124 is substantially perpendicular 122 to the flange. In one embodiment, the channel 130 is substantially perpendicular 126 to at least one channel wall 124. In one embodiment, the channel 130 comprises substantially straight walls or walls that would be substantially parallel to the direction in which a perforated cut is made.

Figure 6:
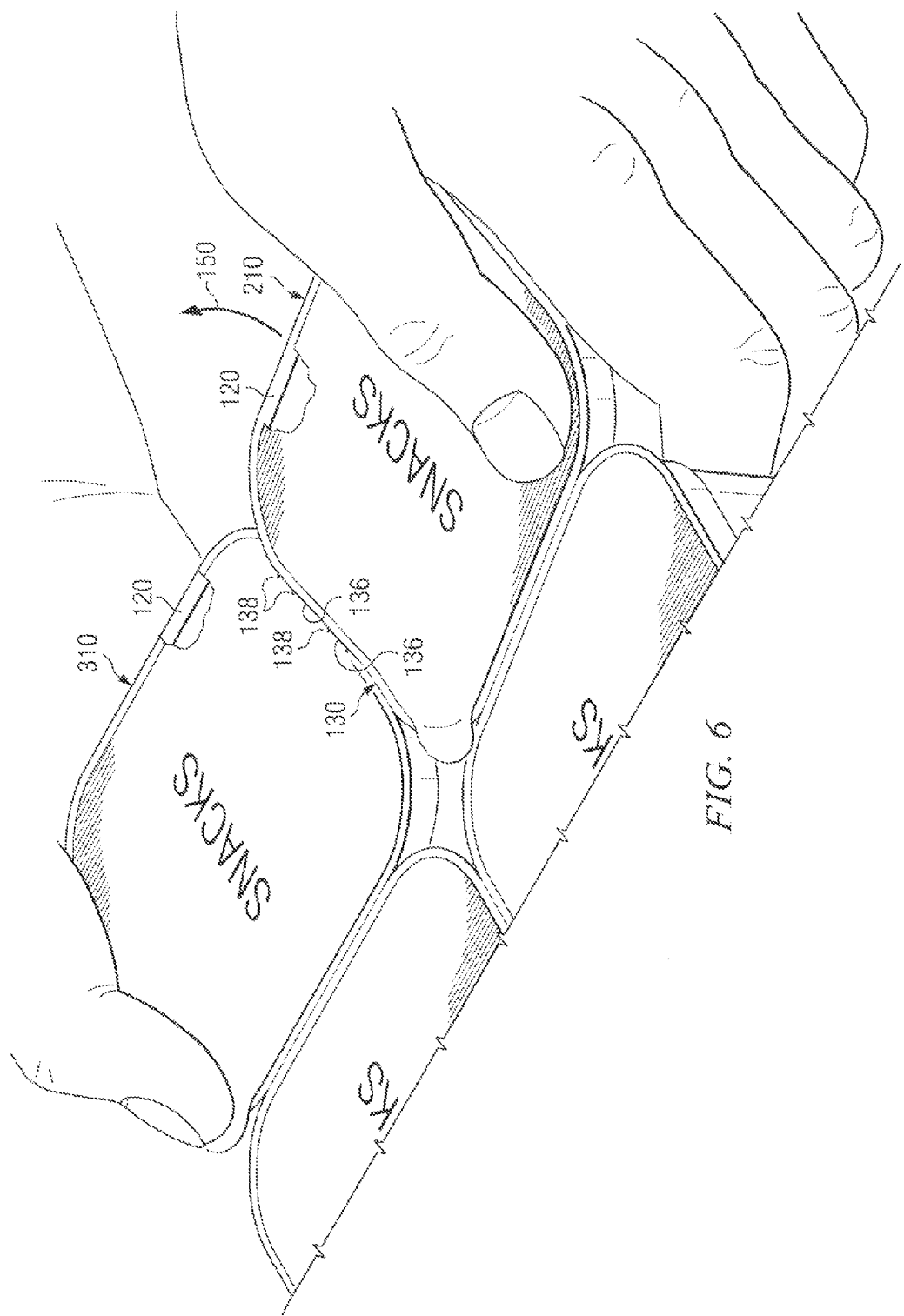
FIG. 6 is a perspective view depicting the removal of a container from the multi-pack assembly depicted in FIG. 1.

FIG. 6 is a perspective view depicting the removal of a container from the multi-pack assembly depicted in FIG. 1. As shown in FIG. 6, the first container 210 can be flexed in a direction indicated by arrow 150 to break apart ties 138 to produce a controlled tearing through the channel 130 to separate the first container 210 from the second container 310. However, flexing is not required and a consumer can separate the first container 210 from the second container 310 with mere tensile force. Without the channel, tearing can be difficult to control and the flange 120 area of either the first container 210 or the second container 310 can be inadvertently and undesirably torn during detachment of separation of the first container 210. Such propagation of tearing into the flange area or onto the lidstock is undesirable as it can cause an unwelcome mess and/or expose the food product to atmospheric conditions earlier than desired.

There are numerous advantages to the present invention. First, the present invention provides a method for making a detachably connected multi-pack container for shelf-stable, low moisture, ready-to-eat food products. The present invention permits a multi-pack container that has moisture barrier properties and optionally oxygen barrier properties. Further, in one embodiment, the present invention produces a multi-pack container that can preserve and enhance the shelf life of food and non-food, oxygen-sensitive items. Further, the present invention provides a multi-pack container made from a material that can be retorted. Consequently, food products needing hot fill or retort applications such as dips or sauces including salsa and ketchup can be packaged in accordance with the present invention. Secondary packaging typically required for polypropylene or polyolefin type packages is thereby eliminated. Moreover, food products can be provided in individual serving sizes that can be easily packed individually with lunches without requiring the opening of the food package and placement into another package such as a plastic bag.

Second, as the product is consumed, packaging also disappears. Consequently, the notion of a "disappearing package" in the pantry can be achieved whereby the amount of packaging left is commensurate with the amount of food product left. Further, the food product stays together and is unitized unlike packages connected by cardboard.

Third, a multi-pack container can be used in a thermoforming process resulting in higher cavitation and greater throughput than is currently allowed for single-serve polypropylene products that are individually packaged together in cardboard.

Fourth, the channel breaks up the area between the containers to help ensure the lidstock is more easily punctured and/or cut during the perforation step so that when the containers are detached the lidstock on the adjacent container is not torn.

As used herein, the term "package" should be understood to include any food container comprising a polyolefin sheet. While the layers and sheets discussed herein are contemplated for use in processes for the packaging of snack foods, the multi-pack container can also be put to use for packaging of non-food products. While the invention has been particularly shown and described with reference to a preferred embodiment, it will be understood by those skilled in the art and the various changes in form and detail may be made therein without departing from the spirit and scope of the invention.

What is claimed is:

1. A detachably connected multi-pack container comprising:
   a first individual container having a first outwardly projecting flange;
   a second individual container having a second outwardly projecting flange; and
   a perforated thinned channel having a channel width and a channel depth detachably connecting said first and second outwardly projecting flange, wherein said thinned channel is of uniform thickness along the length of the flanges, said uniform thickness less than a thickness of said flanges, wherein said thinned channel comprises a planar thickness from said first outwardly projecting flange to said second outwardly projecting flange, and further wherein said containers are made from a thermoformed, multi-layer sheet material having an oxygen transmission rate of less than 1.92 cc/day/m$^2$.

2. The multi-pack of claim 1 wherein each container comprises HDPE.

3. The multi-pack of claim 1 wherein each container comprises polypropylene.

4. The multi-pack of claim 3 wherein said material comprises EVOH.

5. The multi-pack of claim 4 wherein said material comprises an oxygen transmission rate of less than about 0.4 cc/day/m$^2$/mil.

6. The multi-pack of claim 1 wherein said channel is substantially U-shaped.

7. The multi-pack of claim 1 wherein said channel is substantially V-shaped.

8. The multi-pack of claim 1 wherein said channel further comprises one or more channel walls wherein at least one of said channel walls is substantially perpendicular to said first outwardly projecting flange and said second outwardly projecting flange.

9. The multi-pack of claim 1 wherein said channel width is greater than about 20 mils.

10. The multi-pack of claim 1 wherein each of said flanges comprise a thickness of more than about 5 mils.

11. The multi-pack of claim 1 wherein said channel thickness is less than about one-half of said flange thickness.

12. The multi-pack of claim 1 wherein said channel thickness is greater than about 1 mil.

13. The multi-pack of claim 1 wherein each of said flanges terminates substantially perpendicular to said channel.

14. The multi-pack of claim 1 wherein said each container comprises a moisture vapor transmission rate of less than about 25 g/day/m$^2$/mil.

15. The multi-pack of claim 1, wherein said channel width is substantially the same along said channel depth.

16. The multi-pack of claim 1 wherein each container further comprises a lidstock.

17. The multi-pack of claim 16 wherein said lidstock is perforated.

18. The multi-pack of claim 1 wherein said thinned channel is flush with the bottom of the flange of adjacent containers.

* * * * *